J. ZYGMAN.
AUTOMOBILE BODY.
APPLICATION FILED APR. 26, 1921.

1,395,544.

Patented Nov. 1, 1921.

Inventor
JOZEF ZYGMAN

J. ZYGMAN.
AUTOMOBILE BODY.
APPLICATION FILED APR. 26, 1921.

1,395,544.

Patented Nov. 1, 1921.
2 SHEETS—SHEET 2.

Inventor
JOZEF ZYGMAN
By
Attorney

UNITED STATES PATENT OFFICE.

JOZEF ZYGMAN, OF GREENWICH, CONNECTICUT.

AUTOMOBILE-BODY.

1,395,544.  Specification of Letters Patent.  Patented Nov. 1, 1921.

Application filed April 26, 1921. Serial No. 464,741.

*To all whom it may concern:*

Be it known that I, JOZEF ZYGMAN, citizen of Poland, residing at Greenwich, in the county of Fairfield and State of Connecticut, have invented certain new and useful Improvements in Automobile-Bodies, of which the following is a specification.

This invention relates to automobiles, having more particular reference to the construction of the body thereof, being intended more particularly for embodiment in connection with bodies of the limousine and sedan type.

The invention has for an object to provide a novel arrangement of parts whereby such automobile bodies may be lengthened or shortened as may be desired.

For further comprehension of the invention, and of the objects and advantages thereof, reference will be had to the following description and accompanying drawings, and to the appended claims in which the various novel features of the invention are more particularly set forth.

Figure 1 of the drawings is a horizontal sectional view of an automobile having the invention applied thereto, the running gear being omitted.

Figure 1:
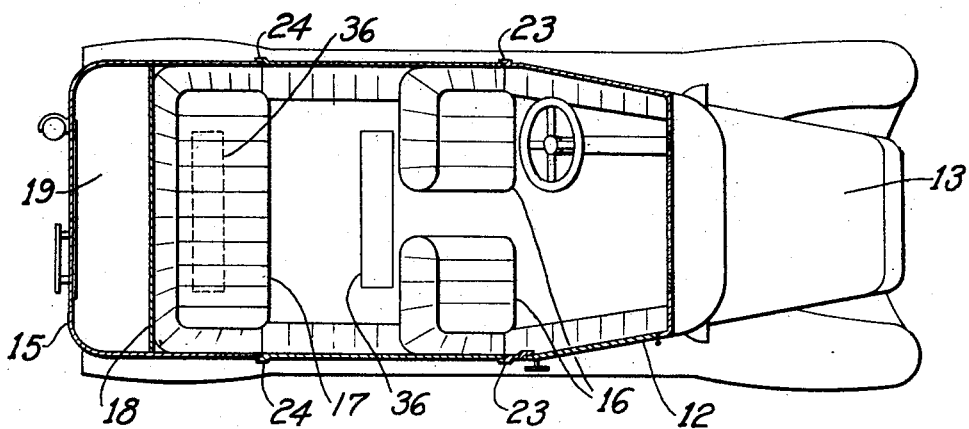
Figure 2:
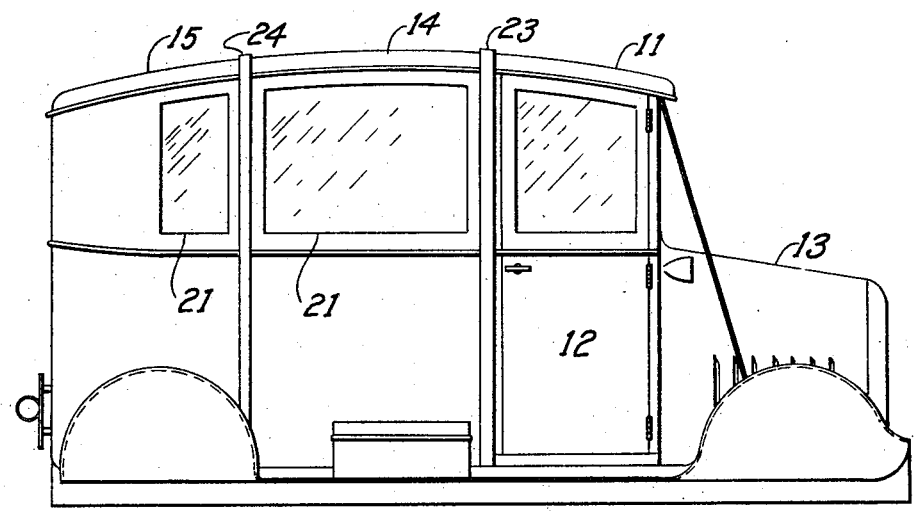
Fig. 2 is a side view thereof.
Figure 3:
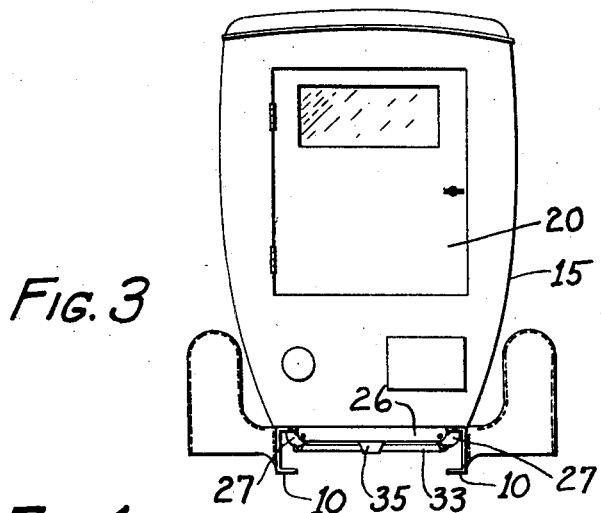
Fig. 3 is a rear view.

In the drawings the usual channel beams forming the side members of the frame or chassis are shown at 10, it being understood that the running gear and drive mechanism may be connected thereto in any suitable or usual manner.

The body of the automobile comprises a fixed front portion or section 11 provided with the usual door or doors such as 12, the dash-board of the automobile being arranged as a part of the front wall of this portion, the engine hood being indicated at 13 as extending forwardly therefrom.

The body of the automobile also comprises an intermediate removable section 14 and an adjustable rear section 15, the intermediate section comprising only sides, bottom and top. This intermediate section has mounted therein, to be removed therewith, a pair of seats 16 which are spaced apart to permit of passage between the front and rear sections of the automobile body.

The rear section carries a single seat 17 extending the full width of the automobile, a transverse vertical partition 18 extending across this rear section just behind the seat 17, leaving a chamber 19 therebetween and the rear wall 15′ of the said section, a door 20 being provided in this rear wall for access to the chamber 19. The intermediate and rear sections 14 and 15 may have suitable windows such as 21 formed in the sides thereof, while it is to be understood that the usual wind-shield arrangement, or other window structure, will be provided above the dash-board of the automobile, and that the interior of the body may be upholstered in the usual manner.

At the points where the different sections meet I provide an overlapping joint arrangement by means of the rearwardly extending flanges 23, 24 on the front and intermediate sections, which flanges are engaged by the front edges of the intermediate and rear sections respectively, the front edge of the rear section engaging with the flange 23 when the intermediate section is removed.

Figure 4:
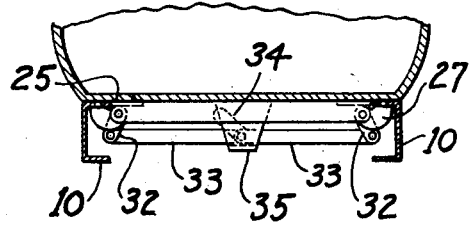
Fig. 4 is a fragmentary transverse section showing the locking means holding the adjustable body sections in place, this view being taken on the line 4—4 of Fig. 6.
Figure 5:
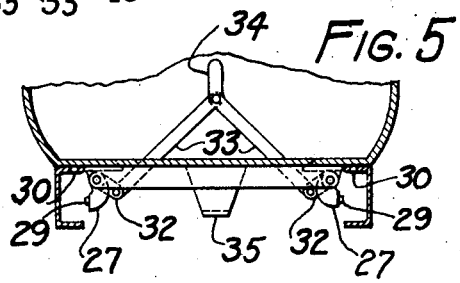
Fig. 5 is a similar view but showing the locking means released.
Figure 6:
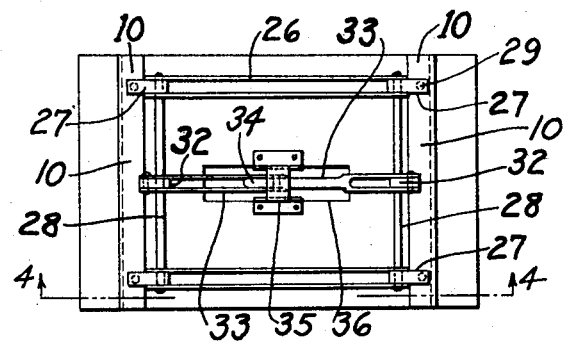
Fig. 6 is an underside plan view of the parts as shown in Fig. 4.

For detachably holding the intermediate and rear sections 14, 15 of the body in place I provide the means illustrated in detail in Figs. 4, 5 and 6. As there shown the flooring 25, which may be that of either section, has fixed to the underside thereof, adjacent its front and rear edges, the transverse channel irons 26 between the ends of which are pivoted the latch arms 27, these arms being fixed on shafts 28 suitably journaled in the ends of the channel irons 26. Upon the free ends of the latch arms 27 are studs 29 which are adapted to engage in sockets 30 in the top flanges of the channel beams 10 before referred to.

Fixed to the shafts 28, midway between opposite ends thereof, are lever arms 32 to which are attached the opposed ends of a pair of toggle bars 33 whose adjacent ends have a handle 34 connected thereto. Fixed to the flooring 25, midway between the shafts 28 is a U-shaped bracket 35 which straddles the toggle bars 33 when the latter are in position with the latch arms 27 operating, and forms a support for the said toggle bars. A removable plate 36 is provided in the flooring 25 for access to the handle.

When the parts are in operative position, as in Fig. 4, the latch arms 27 have been swung outwardly and upwardly against the top flanges of the angle beams 10, the studs 29 projecting upwardly into the sockets 30. In this position the toggle bars 33 are moved just beyond dead center, and form a lock for the latches 27, the plate 36 covering the toggle bars and the handle 34. To detach either body section the proper plate 36 is lifted, the handle 34 grasped and the toggle bars 33 swung upward to the position shown in Fig. 5, in which the latch arms 27 are clear of the flanges of the angle beams 10. In changing the body from a limousine to a sedan type, the rear section 15 may be moved slightly back to disengage the flanges 24. The intermediate section 14, is then removed and the rear section moved forward to engage the front section 11 and then locked in position.

Having thus described my invention what I claim as new and desire to protect by Letters Patent of the United States is as follows:

1. In an automobile, side frame members, a body element adapted to rest thereon, a pair of longitudinal shafts journaled to and under the floor of the body element one adjacent each side thereof, lever arms and latch arms fixed to said shaft, and a pair of toggle bars having opposed ends connected to said lever arms, the said floor of the body element having an opening therein for access to the toggle bars to operate the same.

2. In an automobile, side frame members, a body element adapted to rest thereon, a pair of longitudinal shafts journaled to and under the floor of the body element one adjacent each side thereof, lever arms and latch arms fixed to said shaft, and a pair of toggle bars having opposed ends connected to said lever arms, the said floor of the body element having an opening therein for access to the toggle bars to operate the same, and a removable plate covering said opening.

3. In an automobile, side frame members, a body element adapted to rest thereon, a pair of longitudinal shafts journaled to and under the floor body element one adjacent each side thereof, lever arms and latch arms fixed to said shaft, a pair of toggle bars extending transversely of the vehicle and having opposed ends connected to said lever arms, a handle element pivotally connected to adjacent ends of said toggle bars, the said floor of the body element having an opening therein for access to the said handle element, and a removable plate covering said opening.

4. In an automobile, side frame members, a body element adapted to rest thereon, a pair of latch arms at each side of said body element adapted to engage the said frame elements, and a toggle bar device adapted to move said latch arms into and out of operative position, and to assume an approximate dead center position when said latch arms are in operative position, said latch arms having studs on their free ends adapted to engage in sockets in the said side frame members.

5. In an automobile, channeled side frame members, a body element adapted to rest thereon, a pair of longitudinal shafts journaled to and under the flooring of the said body element one adjacent each side thereof, lever arms fixed to said shafts a pair of toggle bars having opposed ends connected to said lever arms, a handle for operating said toggle bars, and a pair of latch arms on each of said shafts adapted to engage said channeled side frame members.

6. In an automobile, channeled side frame members, a body element adapted to rest thereon, a pair of longitudinal shafts journaled to and under the flooring of the said body element one adjacent each side thereof, lever arms fixed to said shafts, a pair of toggle bars having opposed ends connected to said lever arms, a handle for operating said toggle bars, and a pair of latch arms on each of said shafts adapted to engage said channeled side frame members, said latch arms having studs on their free ends adapted to engage in sockets in the flanges of said frame members.

7. In an automobile, channeled side frame members, a body element adapted to rest thereon, a pair of longitudinal shafts journaled to and under the flooring of the said body element one adjacent each side thereof, lever arms fixed to said shafts, a pair of toggle bars having opposed ends connected to said lever arms, a handle for operating said toggle bars, and a pair of latch arms on each of said shafts adapted to engage said channeled side frame members, said latch arms having studs on their free ends adapted to engage in sockets in the flanges of said frame members, said toggle bars being adapted to assume an approximate dead center position when said latch arms are in operative position, and a yoke bracket secured to the flooring of the said body element to limit the movement of the toggle bars past dead center position.

In testimony whereof I have affixed my signature.

JOZEF ZYGMAN.